United States Patent
Chowdhury et al.

(10) Patent No.: US 6,254,312 B1
(45) Date of Patent: Jul. 3, 2001

(54) STABILIZATION OF ARSENIC-CONTAMINATED MATERIALS

(75) Inventors: Ajit K Chowdhury; Lane D Tickanen, both of Madison, WI (US)

(73) Assignee: RMT, Inc., Madison, WI (US)

( * ) Notice: Subject to any disclaimer, the term of this patent is extended or adjusted under 35 U.S.C. 154(b) by 0 days.

(21) Appl. No.: 09/099,738

(22) Filed: Jun. 18, 1998

(51) Int. Cl.⁷ ........................................... A62D 3/00
(52) U.S. Cl. ........................ 405/128.5; 405/129.25; 588/256; 423/87
(58) Field of Search ..................... 405/128, 129; 588/249, 252, 256; 423/87, 265, 266; 210/911, 912

(56) References Cited

U.S. PATENT DOCUMENTS

| | | | |
|---|---|---|---|
| 4,079,003 | 3/1978 | Manchak | 210/46 |
| 4,723,992 | 2/1988 | Hager | 71/97 |
| 5,037,479 | 8/1991 | Stanforth | 106/691 |
| 5,114,592 * | 5/1992 | Schuster et al. | 210/911 |
| 5,130,051 | 7/1992 | Falk | 252/315.5 |
| 5,202,033 | 4/1993 | Stanforth et al. | 210/747 |
| 5,252,003 | 10/1993 | McGahan | 405/128 |
| 5,347,077 | 9/1994 | Hooykaas et al. | 588/257 |
| 5,358,643 * | 10/1994 | McClintock | 210/911 |
| 5,387,740 * | 2/1995 | Sasae et al. | 588/256 |
| 5,430,235 | 7/1995 | Hooykaas et al. | 588/252 |
| 5,482,534 * | 1/1996 | Leonard et al. | 423/87 |
| 5,637,355 | 6/1997 | Stanforth et al. | 427/341 |
| 5,769,961 * | 6/1998 | Peters et al. | 588/256 |
| 5,810,920 * | 9/1998 | Ueshima et al. | 588/256 |
| 5,859,306 * | 1/1999 | Stanforth | 588/256 |
| 5,908,559 * | 6/1999 | Kreisler | 210/912 |

OTHER PUBLICATIONS

"Arsenic Stabilization Project Exceeds Objectives", Enviro–Wire homepage, summer 1997.

Masscheleyn et al., "Effect of Redox Potential and pH on Arsenic Speciation and Solubility in a Contaminated Soil", *ES&T* 25(8):1414 (1991) (Abstract).

Fendorf, S., "Processes Influencing the Mobility of Arsenic and Chromium in Reduced Soils and Sediments", Grant Abstract, National Center for Environmental Research and Quality Assurance web site (1997).

"Solucorp's Molecular Bonding System (MBS) Expands Current Industry Horizons for Remediating Heavy Metal", *Molecular Bonding System Applications Summary of Data Compilation Program* (1997).

Vance, D.B., "Arsenic Chemical Behavior and Treatment", *The National Environmental Journal* May/Jun.:60–64 (1995).

Voigt et al., "Chemical Fixation of Arsenic in Contaminated Soils", *Applied Geochemistry* 11(5):633 (1996) (Abstract).

* cited by examiner

Primary Examiner—David Bagnell
Assistant Examiner—Frederick L. Lagman
(74) Attorney, Agent, or Firm—Quarles & Brady LLP

(57) ABSTRACT

A method for stabilizing arsenic in a waste matrix includes the steps of combining with the waste matrix an agent for controlling the oxidation-reduction potential of the matrix, an agent for controlling the pH of the matrix and an agent for adsorbing or coprecipitating the arsenic in the matrix.

24 Claims, No Drawings

STABILIZATION OF ARSENIC-CONTAMINATED MATERIALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to methods for treating an arsenic-contaminated waste matrix to stabilize the arsenic and reduce arsenic leaching to contaminant acceptable levels. Arsenic, which is carcinogenic in its inorganic form, is identified in the Resource Conservation Recovery Act (RCRA) as a hazardous metal and is reportedly the third most common regulated inorganic contaminant found at Superfund sites.

Specific sources of hazardous waste containing arsenic include:

pesticides and herbicides [MSMA (monosodium methane arsonate), cacodylic acid (dimethyl arsinic acid), sodium arsenite, lead arsenate)], ammonia still lime sludge from coking operations, veterinary pharmaceuticals [(RCRA waste listing K084) wastewater treatment sludge, (K101) distillation tar residue from distillation of aniline-based compounds, (K102) residue from use of activated carbon for decolorization], arsenic sulfide (D004) generated from phosphoric acid purification, and wood preservative manufacturing wastes.

Other anthropogenic sources of arsenic include:

coal-burning fly ash from energy production copper, lead and zinc smelter operations gold mining operations, and glass manufacturing and cotton gin processing.

While arsenic, like other metals, exhibits a positive valence state, in aqueous materials it usually exists not as a solitary cationic species but as an oxy-anion, typically in a mixture of a trivalent (+3), reduced form (arsenite, $AsO_3^{3-}$) and/or a pentavalent (+5) oxidized form (arsenate, $AsO_4^{3-}$). As a result, technologies that effectively treat other cationic metals are typically not effective for stabilizing arsenic.

The ability of arsenic to change oxidation state under certain environmental conditions poses a challenge to treatment methods because the different oxidation states have different mobilities in the environment. Arsenite is usually more mobile than arsenate. Also, arsenic is amenable to numerous chemical and biological transformations in the environment, which can result in increased mobility. The mobility of arsenic can be controlled by redox conditions, pH, biological activity and adsorption/desorption reactions.

Arsenic stabilization chemistry is complex and is influenced significantly by the chemical speciation of arsenic (valence state, inorganic vs. organic, etc.), the oxidation-reduction potential and acidity/alkalinity of the waste matrix, and the presence of other metals, counter ions, and complexing ligands. Arsenic is often present in waste with lead or chromium. Typical techniques for stabilizing these metals (e.g., treating with phosphate to stabilize lead, or treating with reducing agents to stabilize chromium) can undesirably increase arsenic leachability from wastes. When arsenic and chromium are found in together in the same waste matrix, the contaminants are typically present as chromated copper arsenate (CCA).

According to the U.S. Environmental Protection Agency, slag vitrification at 1,100 to 1,400° C. is the Best Demonstrated Available Treatment (BDAT) for arsenic. In a vitrification process, all forms of arsenic are converted to arsenic oxide, which reacts with other glass-forming constituents and becomes immobilized in the glass formed. In most arsenic stabilization situations, vitrification is impractical, however, because of the high energy costs and a secondary problem of volatilizing arsenic to cause air pollution.

Other known detoxification technologies include chemistries that involve solidification or chemical stabilization. "Solidification" is defined by US EPA as a technique that encapsulates the waste in a monolithic solid of high structural integrity. The encapsulation may be effected by fine waste particles (microencapsulation) or by a large block or container of wastes (macroencapsulation). Solidification does not necessarily involve a chemical interaction between the wastes and the solidifying reagents, but may mechanically bind the waste into the monolith. Contaminant migration is restricted by decreasing the surface area exposed to leaching and/or by isolating the wastes within an impervious capsule. "Stabilization" refers to those techniques that reduce the hazard potential of a waste by converting the contaminants into their least soluble, mobile, or toxic form. The physical nature and handling characteristics of the waste are not necessarily changed by stabilization. These definitions appear on page 2 of Conner, J. R., *Chemical Fixation and Solidification of Hazardous Wastes,* Van Nostrand Reinhold, New York (1990), which is incorporated herein by reference in its entirety.

U.S. Pat. No. 5,037,479 (Stanforth) discloses a method for treating solid hazardous waste containing unacceptable levels of leachable metals such as lead, cadmium and zinc, which includes the steps of mixing the solid waste with at least two additives, a pH buffering agent and an additional agent which is a salt or acid containing an anion that forms insoluble or non-leachable forms of the leachable metal, each agent being selected from a specified group of agents.

U.S. Pat. No. 5,202,033 (Stanforth et al.) discloses a method for treating solid hazardous waste containing unacceptable levels of leachable metals such as lead, cadmium, arsenic, zinc, copper and chromium, which includes the steps of mixing the solid waste in situ with a phosphate source or a carbonate source or ferrous sulfate. An additional pH controlling agent is optionally added under conditions which support reaction between the additive and pH controlling agent and the metals, to convert the metals to a relatively stable non-leachable form.

U.S. Pat. No. 5,430,235 (Hooykaas et al.) discloses a process for solidifying an arsenic-contaminated matrix as a rock-hard product using high dosages of a clay material, an iron salt, a manganese salt, an oxidizer, and a hydraulic binder such as Portland cement. The process disclosed in U.S. Pat. No. 5,430,235 has several disadvantages. Because of the requirement for a hydraulic binder, the process includes a curing period of 7 days or longer. The process also results in significant bulking (volume increase) of the treated waste materials. If dosage levels are lower than those identified as preferred, it is difficult to achieve solidification.

U.S. Pat. No. 5,347,077 (Hooykaas et al.) discloses a process for solidifying contaminated soil, sediment or sludge that may contain arsenic by adding iron, manganese, aluminum salts and Portland cement at dosages of 20 percent by weight and higher. Again, the process requires a curing period and has the additional disadvantage of high bulking after treatment. Hooykaas et al. use an oxidizing agent to oxidize organic matter, since it is difficult to solidify the waste matrix in the presence of organic matter. U.S. Pat. No. 5,252,003 (McGahan) discloses a process for controlling arsenic leaching from waste materials by adding iron (III) ions and magnesium (II) ions, preferably in the form of iron (III) sulfate and magnesium oxide.

U.S. Pat. No. 4,723,992 (Hager) discloses a process for fixing pentavalent arsenic in soil by adding metal salts or iron, aluminum, or chromium and a weak organic acid.

U.S. Pat. No. 5,130,051 (Falk) discloses a process for encapsulating waste that contains toxic metals, including arsenic, by adding a mixture of alkaline silicate and magnesium oxide, and, optionally, borax, a concentrated acid, a reducing agent, and fly ash at high dosage rates.

The iron (ferric) sulfate treatment process is ineffective against reduced forms of arsenic and does not provide long-term stability of treated wastes because, under certain natural conditions, the ferric ions may be reduced to ferrous form, thereby remobilizing the arsenic. The solidification processes require very high additive dosages with resultant high bulking of the treated waste.

None of the known technologies discloses a process for cost-effectively and permanently stabilizing arsenic in contaminated soil, sediment, or sludge where the arsenic can be present in trivalent and pentavalent states, and in both organic and inorganic forms.

The patents mentioned in the Background of the Invention are specifically incorporated herein by reference in their entirety.

BRIEF SUMMARY OF THE INVENTION

The present invention provides a method for stabilizing an arsenic-contaminated waste matrix and reducing the leaching of arsenic to acceptable levels. A major objective of the invention is to provide a method for treating an arsenic-contaminated waste matrix that contains arsenic in both the reduced (arsenite) and/or the oxidized (arsenate) form. Other objectives of the invention include efficiently treating both organic and inorganic arsenic compounds, providing long-term, permanent treatment of arsenic, providing treatment with low bulking potential, and providing a treatment method that is cost-effective and easy to conduct.

In the method of the present invention, an agent for controlling oxidation-reduction (redox) potential (ORP), an agent for controlling pH, and an agent for adsorption and coprecipitation of the arsenic are mixed with the arsenic-contaminated material.

The sum of the amounts of added ORP control agent, pH control agent and adsorption-coprecipitation agent are insufficient to cause the waste matrix to solidify without adding a binding agent of the type identified by Hooykaas. The ORP control agent and the pH control agent are added in amounts that will vary with the amount of contaminants present, but in any event, in amounts sufficient to bring most (at least about 50%) of the contaminating arsenic into its higher oxidized state. The arsenite/arsenate transition is controlled by adjusting the redox potential and pH in a coordinated manner. For example, see Vance, D. B., "Arsenic: Chemical Behavior and Treatment," *National Environmental Journal* 60–64 (May/June 1995), incorporated by reference herein in its entirety, which includes charts that depict the speciation of arsenic under various conditions. Agents for adsorbing and coprecipitating arsenic, such as ferric iron, are also known. Id. Although the chemicals used in the stabilization process can have a higher unit cost, the package cost is lower than that of solidification methods because the chemicals are used in small amounts. The ORP control agent, pH control agent and adsorption-coprecipitation agent can each be added to between 0.01 and 10 percent of the waste matrix, by weight.

The invention will be more fully understood upon consideration of the following detailed description.

BRIEF DESCRIPTION OF THE SEVERAL VIEWS OF THE DRAWINGS

Not applicable.

DETAILED DESCRIPTION OF THE INVENTION

The invention describes a cost-effective, low-bulking, permanent method for stabilizing an arsenic-contaminated waste matrix wherein the method comprises the steps of incorporating an ORP control agent, a pH control agent, and an adsorption-coprecipitation agent. The types and additive rates of these component chemistries will depend on arsenic speciation and concentration, the waste matrix, and on the overall treatment objectives. A goal achieved by the method of the present invention is to bring the level of leachable arsenic to no higher than the maximum acceptable Toxicity Characteristic Leaching Procedure (TCLP) toxicity level of 5 mg/L dictated by RCRA. The same level would be set as the criterion for TCLP-arsenic in the proposed Universal Treatment Standard (UTS). The leachable arsenic as measured by the TCLP test can be reduced to a level below the maximum acceptable toxicity level of 5.0 mg/L, e.g., 0.5 mg/L, and perhaps lower.

The arsenic-contaminated materials can include, but are not limited to, sediment, soil, sludge and industrial wastes. The method is a low-bulking method, by which it is intended that after practicing the method the waste matrix volume is preferably no more than 10% greater, and more preferably no more than 5% greater, than before stabilization.

In a first embodiment of the method, each of the three agents is a separate class of chemical compound. In a second embodiment, a single chemical additive can act as two components in the treatment. An alternative would be that the chemical species added initially as one component of the chemistry may react with a waste matrix to produce a second component of the chemistry. In another embodiment, under suitable conditions, one chemical compound added to a specific waste matrix can serve the function of all three components in the disclosed arsenic stabilization method.

The ORP control agent can increase or decrease the redox potential of the waste matrix depending upon the arsenic speciation and presence of other metal contaminants. It is desirable to reduce the mobility by providing conditions where most (at least about 50%, preferably 60 to 95%, more preferably 80 to 95%) of the arsenic compounds are present in the higher oxidized (arsenate) state. For example, if a substantial fraction of arsenic is present in the arsenite form and no other major heavy metal oxy-anions are present in the waste, an oxidizing ORP agent is selected to increase the redox potential of the waste matrix.

This can be complicated by the presence of other heavy metal oxy-anions, such as hexavalent chromium, in the waste matrix. If the waste contains arsenic and another such heavy metal compound, the leaching potential of both the arsenic and the other heavy metal is decreased by lowering the redox potential of the waste matrix using a reducing ORP control agent. In this situation the ORP is reduced enough to convert chromium from its hexavalent state to less mobile trivalent state while the ORP would still be in the range for arsenic to be present most in its less mobile pentavalent state.

The oxidizing ORP control agent can be any compound that increases the redox potential of the waste matrix, although the compound is preferably one that has insignificant environmental impact upon the matrix. Suitable oxidizing ORP control agents include potassium permanganate, sodium chlorate, sodium perchlorate, calcium chlorite or another chlorinated oxidizing agent, sodium percarbonate, sodium persulfate, sodium perborate, potassium persulfate, hydrogen peroxide, magnesium peroxide, or another peroxide compound, compounds of multivalent elements at their higher oxidation state (e.g., ferric sulfate), gaseous oxygen, and ozone.

The reducing ORP control agents can be any compound that decreases the redox potential of the waste matrix, although the compound is preferably one that has insignificant environmental impact upon the matrix. Suitable reducing ORP control agents include ferrous sulfate, sulfur dioxide, sodium bisulfite, sodium metabisulfite, or the like.

In the presence of the adsorption-coprecipitation agent, the pH of the waste matrix controls the leaching potential of arsenic in conjunction with the redox potential of the waste. The pH control agent is selected to raise or lower the pH of the waste matrix depending on the original acidity/alkalinity of the waste and the treatment objectives, in accordance with the diagrams shown in Vance, supra. The pH control agents for raising pH can be any compound that raises the pH, without significant environmental impact, and can include magnesium oxide or hydroxide, calcium oxide or hydroxide, barium oxide or hydroxide, reactive calcium carbonate, sodium hydroxide, dolomitic lime, limestone (high calcium or dolomite), and the like.

The pH control agents for lowering pH can be any compound that lowers the pH, without significant environmental impact, and can include sulfuric acid, phosphoric acid, another mineral acid, or ferric sulfate, ferric chloride, aluminum sulfate, aluminum chloride, and like acidic compounds.

A suitable adsorption-coprecipitation agent can react with arsenic to form an insoluble arsenic compound or can immobilize arsenic on its surface by chemical adsorption. The adsorption-coprecipitation agent can be, but is not limited to, ferric sulfate, aluminum sulfate, activated alumina, or manganese dioxide.

The chemical additives, which can be in a solid state, aqueous slurry, or in solution, are thoroughly mixed with the waste matrix to be stabilized. The stabilization method can be performed in situ using conventional earth-moving equipment such as a back hoe, tiller, or drag line, or ex situ by blending the additives with the waste matrix in a mechanical device, such as a pugmill or a cement mixer. In a typical practice of the method for stabilizing arsenic and reducing arsenic leachability, the ORP control agent is mixed first with the waste matrix, followed by the adsorption-coprecipitation agent and then the pH control agent. Alternatively, all three components can be added simultaneously to, and mixed with, the waste matrix. The additive dosage requirements typically total less than 10–15 percent of the weight of the waste matrix. This is a major advantage over solidification methods, which require 20–30 percent or higher dosages of additives, including cement-like materials.

If the additives are mixed uniformly with the waste, no curing step is required. This is another significant advantage over solidification systems which typically requiring curing periods of one week or more.

The present invention will be more fully understood upon consideration of the following Examples which are intended to be exemplary and not limiting.

EXAMPLE 1

TABLE 1

| Additive (wt %) | Untreated | | Treatment | | |
|---|---|---|---|---|---|
| ORP control (potassium permanganate) | — | — | — | — | 0.5 |
| pH control (magnesium oxide) | — | — | 1 | 1 | 1 |
| Ads/Coprecip (ferric sulfate) | — | 5 | 5 | 10 | 5 |
| TCLP (mg/L) | 26.0 | 17.0 | 2.4 | 1.9 | 0.75 |

An arsenic-contaminated river sediment contained 14,000 mg/kg dry weight total arsenic and was determined to contain hazardous levels of arsenic, with a screening TCLP-arsenic concentration of 26.0 mg/L. The sediment was treated with a 3-component treatment chemistry according to the present invention. In this trial, shown in Table 1, the ORP control agent (potassium permanganate) was added at 0.5 percent by weight. The pH control agent (magnesium oxide) was added at 1 percent by weight. The adsorption-coprecipitation (Ads/Coprecip) agent (ferric sulfate) was added at 5 percent by weight. The sediment treated according to the invention was nonhazardous and had a screening TCLP-arsenic concentration of 0.75 mg/L.

In controls, ferric sulfate alone (5 percent by weight) reduced the screening TCLP-arsenic concentration to 17.0 mg/L, while magnesium oxide (1 percent by weight) with ferric sulfate (5 percent by weight) reduced the screening TCLP-arsenic concentration to 2.4 mg/L, respectively. At a higher dosage of ferric sulfate (10 percent by weight) with magnesium oxide (1 percent by weight), treatability of the sediment improved marginally, reducing the screening TCLP-arsenic concentration to 1.9 mg/L.

EXAMPLE 2

TABLE 2

| Additive (wt %) | Untreated | | Treatment | | |
|---|---|---|---|---|---|
| ORP control (potassium permanganate) | — | — | 5 | — | — | 5 |
| pH control (magnesium oxide) | — | 5 | — | — | 5 | 5 |
| Ads/Coprecip (ferric sulfate) | — | — | — | 5 | 5 | 5 |
| TCLP (mg/L) | 290 | 220 | 160 | 69 | 14.0 | 1.1 |

Arsenic-contaminated soil containing 10,100 mg/kg dry weight arsenic had a screening TCLP-arsenic concentration of 290 mg/L. This contaminated soil was treated with the additives described in Example 1, either singly or in combination. Separate treatment with 5 percent by weight dosages of potassium permanganate, magnesium oxide, or ferric sulfate gave screening TCLP-arsenic concentrations of 160 mg/L, 220 mg/L, and 69 mg/L, respectively. When magnesium oxide and ferric sulfate were mixed with the soil at 5 percent by weight each, the screening TCLP-arsenic concentration was reduced to 14.0 mg/L. When potassium permanganate, magnesium oxide, and ferric sulfate were added at 5 percent by weight each, the soil was rendered nonhazardous with a screening TCLP-arsenic concentration of 1.1 mg/L.

The present invention is not intended to be limited by the foregoing, but rather to encompass all such variations and modifications as come within the scope of the following claims.

We claim:

1. A method for stabilizing arsenic in an arsenic-contaminated waste matrix, the method comprising the steps of:
    mixing with the waste an agent for controlling oxidation-reduction potential of the matrix, an agent for controlling pH of the matrix, and an agent for adsorbing and coprecipitating the arsenic, so that the arsenic leaches from the waste matrix at no higher than a preselected level, the sum of the amounts of the added agents being insufficient to cause the waste matrix to solidify without a binding agent, wherein the agent for controlling oxidation-reduction potential and the agent for adsorption-coprecipitation are the same agent.

2. A method as claimed in claim 1 wherein the agent for controlling oxidation-reduction potential and the agent for adsorption-coprecipitation is potassium permanganate.

3. A method as claimed in claim 1 wherein the agent for controlling pH and the agent for adsorption-coprecipitation are the same agent.

4. A method as claimed in claim 3 wherein the agent for controlling pH and the agent for adsorption-coprecipitation is ferric sulfate.

5. A method as claimed in claim 1 wherein at least two of the agents are ferric sulfate.

6. A method as claimed in claim 1 wherein all three agents are ferric sulfate.

7. A method for stabilizing arsenic in an arsenic-contaminated waste matrix, the method consisting essentially of the step of:
    mixing with the waste an agent for controlling oxidation-reduction potential of the matrix, an agent for controlling pH of the matrix, and an agent for adsorbing and coprecipitating the arsenic, the sum of the amounts of added agents being insufficient to cause the waste matrix to solidify without a binding agent wherein the agent for controlling oxidation-reduction potential and the agent for adsorption-coprecipitation are the same agent.

8. A method as claimed in claim 7 wherein the agent for controlling oxidation-reduction potential and the agent for adsorption-coprecipitation is potassium permanganate.

9. A method as claimed in claim 7 wherein the agent for controlling pH and the agent for adsorption-coprecipitation are the same agent.

10. A method as claimed in claim 9 wherein the agent for controlling pH and the agent for adsorption-coprecipitation is ferric sulfate.

11. A method as claimed in claim 7 wherein at least two of the agents are ferric sulfate.

12. A method as claimed in claim 7 wherein all three agents are ferric sulfate.

13. A method for stabilizing arsenic in an arsenic-contaminated waste matrix, the method comprising the steps of:
    mixing with the waste an agent for controlling oxidation-reduction potential of the matrix, an agent for controlling pH of the matrix, and an agent for adsorbing and coprecipitating the arsenic, so that the arsenic leaches from the waste matrix at no higher than a preselected level, the sum of the amounts of the agent for controlling oxidation-reduction potential and the agent for controlling pH being sufficient to bring most of the arsenic into an oxidized state, the sum of the amounts of the added agents being insufficient to cause the waste matrix to solidify without a binding agent, wherein the agent for controlling oxidation-reduction potential and the agent for adsorption-coprecipitation are the same agent.

14. A method as claimed in claim 13 wherein the agent for controlling oxidation-reduction potential and the agent for adsorption-coprecipitation is potassium permanganate.

15. A method as claimed in claim 13 wherein at least two of the agents are ferric sulfate.

16. A method as claimed in claim 13 wherein all three agents are ferric sulfate.

17. A method for stabilizing arsenic in an arsenic-contaminated waste matrix, the method comprising the steps of:
    mixing with the waste an agent for controlling oxidation-reduction potential of the matrix, an agent for controlling pH of the matrix, and an agent for adsorbing and coprecipitating the arsenic, so that the arsenic leaches from the waste matrix at no higher than a preselected level, the sum of the amounts of the agent for controlling oxidation-reduction potential and the agent for controlling pH being sufficient to bring most of the arsenic into an oxidized state, the sum of the amounts of the added agents being insufficient to cause the waste matrix to solidify without a binding agent, wherein the agent for controlling pH and the agent for adsorption-coprecipitation are the same agent.

18. A method as claimed in claim 17 wherein the agent for controlling pH and the agent for adsorption-coprecipitation is ferric sulfate.

19. A method for stabilizing arsenic in an arsenic-contaminated waste matrix, the method consisting essentially of the step of:
    mixing with the waste an agent for controlling oxidation-reduction potential of the matrix, an agent for controlling pH of the matrix, and an agent for adsorbing and coprecipitating the arsenic, the sum of the amounts of the agent for controlling oxidation-reduction potential and the agent for controlling pH being sufficient to bring most of the arsenic into an oxidized state, the sum of the amounts of added agents being insufficient to cause the waste matrix to solidify without a binding agent, wherein the agent for controlling oxidation-reduction potential and the agent for adsorption-coprecipitation are the same agent.

20. A method as claimed in claim 19 wherein the agent for controlling oxidation-reduction potential and the agent for adsorption-coprecipitation is potassium permanganate.

21. A method as claimed in claim 19 wherein the agent for controlling pH and the agent for adsorption-coprecipitation is ferric sulfate.

22. A method as claimed in claim 19 wherein at least two of the agents are ferric sulfate.

23. A method as claimed in claim 19 wherein all three agents are ferric sulfate.

24. A method for stabilizing arsenic in an arsenic-contaminated waste matrix, the method consisting essentially of the step of:

mixing with the waste an agent for controlling oxidation-reduction potential of the matrix, an agent for controlling pH of the matrix, and an agent for adsorbing and coprecipitating the arsenic, the sum of the amounts of the agent for controlling oxidation-reduction potential and the agent for controlling pH being sufficient to bring most of the arsenic into an oxidized state, the sum of the amounts of added agents being insufficient to cause the waste matrix to solidify without a binding agent, wherein the agent for controlling pH and the agent for adsorption-coprecipitation are the same agent.

* * * * *